United States Patent
Schuba et al.

(10) Patent No.: US 7,865,608 B1
(45) Date of Patent: Jan. 4, 2011

(54) METHOD AND APPARATUS FOR FAST AND SCALABLE MATCHING OF STRUCTURED DATA STREAMS

(75) Inventors: Christoph L. Schuba, Menlo Park, CA (US); Sumantra R. Kundu, Arlington, TX (US); Jason L. Goldschmidt, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1109 days.

(21) Appl. No.: 11/040,714

(22) Filed: Jan. 21, 2005

(51) Int. Cl.
G06F 15/16 (2006.01)
(52) U.S. Cl. .................................................. 709/231
(58) Field of Classification Search .................. 709/203, 709/230–232, 247; 715/242
See application file for complete search history.

(56) References Cited

U.S. PATENT DOCUMENTS

| | | | | |
|---|---|---|---|---|
| 6,883,137 B1 * | 4/2005 | Girardot et al. | ............. | 715/242 |
| 7,500,017 B2 * | 3/2009 | Cseri et al. | ................. | 709/246 |
| 7,590,644 B2 * | 9/2009 | Matsakis et al. | ................... | 1/1 |
| 7,764,678 B2 * | 7/2010 | Johnson et al. | ............. | 370/389 |
| 2003/0026268 A1 * | 2/2003 | Navas | ......................... | 370/400 |
| 2004/0054924 A1 * | 3/2004 | Chuah et al. | ................. | 713/201 |
| 2004/0098384 A1 * | 5/2004 | Min et al. | ....................... | 707/3 |
| 2005/0149520 A1 * | 7/2005 | De Vries | ......................... | 707/5 |
| 2009/0064326 A1 * | 3/2009 | Goldstein | ..................... | 726/22 |

* cited by examiner

*Primary Examiner*—Douglas B Blair
(74) *Attorney, Agent, or Firm*—Park, Vaughan, Fleming & Dowler LLP

(57) ABSTRACT

One embodiment of the present invention provides a system that classifies elements in a structured data stream. Upon receiving an element from the structured data stream, the system applies a hash function to the element to generate a single hash value. Next, the system divides the single hash value into multiple sections, and uses the multiple sections as inputs to a Bloom filter to determine if a node for the element exists in an associated lookup structure. If so, the system looks up the node for the element in the associated lookup structure. Note that using the Bloom filter in this way prevents unnecessary lookups. Furthermore, using multiple sections of a single hash value as inputs to the Bloom filter eliminates the need to compute multiple hash values.

23 Claims, 7 Drawing Sheets

THE JACCARD COEFFICIENT BETWEEN TWO SETS, A & B, IS DEFINED AS:

$$J = \frac{A \cap B}{A \cup B}$$

SET1 HAS THE MAXIMUM SIMILARITY BETWEEN ITSELF AND THE REFERENCE SET AS MEASURED BY THE JACCARD COEFFICIENT

METHOD AND APPARATUS FOR FAST AND SCALABLE MATCHING OF STRUCTURED DATA STREAMS

BACKGROUND

The present invention relates to the task of managing packet flows in a computer network.

Dramatic advances in networking technology presently make it possible to transfer data at bandwidths exceeding several gigabits per second across a single high-speed optical pipe. These high-speed pipes can be used to connect data centers to wide area networks and the Internet. In order to effectively use the bandwidth available through these high-speed pipes, edge devices within the data centers must be able to manage the packet flows received through these pipes. Examples of operations related to managing network flows include, but are not limited to, performing firewall functions, service level agreement (SLA) monitoring, transport matching, and load balancing. In order to perform these tasks, edge devices need to be constructed so that they scale to high data rates in a reliable fashion.

This problem of managing packet flows is further complicated by the increasing use of structured data within these packet flows. The rapid growth of structured data entities like eXtensible Markup Language (XML) and its embracement by the Electronic Data Interchange (EDI) provides a common presentation protocol for a variety of heterogeneous data sources. However, due to the verbose nature of structured data and the likely future adaptation of selective content encryption, general purpose applications and web servers are likely to encounter a performance problem in handling this structured data.

Note that the ability to interpret structured data entities (e.g., XML) in a packet flow can help to effectively manage the packet flow. For example, a system can send a packet flow to a "specialized" network instance for efficient processing based on interpreting the structured data in the packet flow.

Previous studies of structured and semi-structured data have typically been confined to very large database access and query subsystems. Papers in scientific literature mainly focus on building efficient finite state automata for structured data parsing and query retrieval. At present, no study has focused on methodologies for organizing the structured elements in a zero-collision manner that guarantees efficient retrieval, search, and stream redirection operations.

Hence, what is needed is a method and an apparatus that facilitates interpreting structured data elements while managing packet flows at high data rates.

SUMMARY

One embodiment of the present invention provides a system that classifies elements in a structured data stream. Upon receiving an element from the structured data stream, the system applies a hash function to the element to generate a single hash value. Next, the system divides the single hash value into multiple sections, and uses the multiple sections as inputs to a Bloom filter to determine if a node for the element exists in an associated lookup structure. If so, the system looks up the node for the element in the associated lookup structure. Note that using the Bloom filter in this way prevents unnecessary lookups. Furthermore, using multiple sections of a single hash value as inputs to the Bloom filter eliminates the need to compute multiple hash values.

In a variation on this embodiment, receiving the element from the structured data stream involves: receiving the structured data stream, which contains elements in an ordered sequence; and using a stream grammar to parse the structured data stream, and to extract the element from the structured data stream.

In a variation on this embodiment, looking up the node for the element in the associated lookup structure involves looking up the node for the element in a hash tree (H-tree).

In a further variation, looking up the node for the element in the H-tree involves starting at the root of the H-tree and using a different hash value section to index each successive level of the H-tree. In this variation, each internal node in the H-tree includes a signature mapping table (SMT), which maps a hash value section (associated with the level of the H-tree) to child nodes of the internal node, wherein a child node can either be an internal node or an element node.

In a variation on this embodiment, using the multiple hash key sections as inputs to the Bloom filter involves using each hash key section (of length n bits) to perform a lookup into a different column of a Bloom matrix. In this variation, the Bloom matrix has a different column for each hash key section, and each column in the Bloom matrix is of length $2^n$. If any entry retrieved during a column lookup is not set, the system determines that the corresponding element does not exist in the lookup structure.

In a variation on this embodiment, the node for the element can trigger an action for an associated data stream, wherein the action can involve filtering, redirecting or marking the associated data stream.

In a further variation, if more than one action can be triggered for the associated data stream, a Jaccard coefficient vector is used to select the most relevant action.

In a variation on this embodiment, the system inserts an element into the H-tree by first identifying a location in the H-tree to insert the element into, and then inserting the element into the identified location.

In a variation on this embodiment, the system deletes a node for an element from the H-tree by: deleting an entry which points to the node from a signature mapping table, wherein the signature mapping table is located in an internal node of the H-tree; and releasing a memory block occupied by the node.

In a variation on this embodiment, the structured data stream is structured in accordance with the eXtensible Markup Language (XML) standard.

Table 1 presents an exemplary rule in accordance with an embodiment of the present invention.

Table 2 presents pseudo-code to populate a Bloom matrix in accordance with an embodiment of the present invention.

Table 3 presents pseudo-code to store an element node in an H-tree in accordance with an embodiment of the present invention.

Table 4 presents pseudo-code to search for an element node in an H-tree in accordance with an embodiment of the present invention.

Table 5 presents pseudo-code for checking a Bloom filter in accordance with an embodiment of the present invention.

Table 6 presents an exemplary grammar for an input rule file in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs).

Flow Manager

Figure 1A:
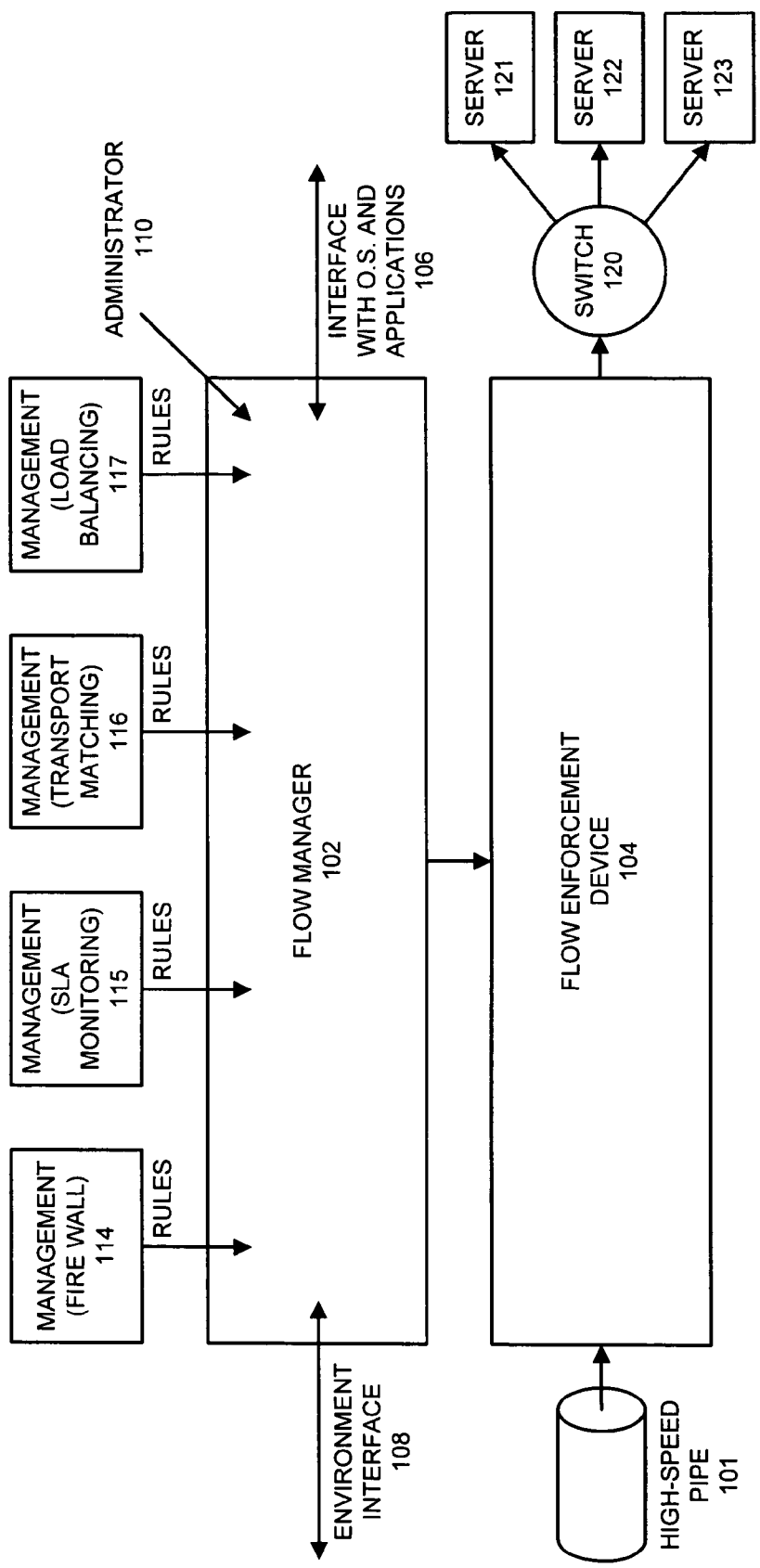
FIG. 1A illustrates a system that handles packet flows in accordance with an embodiment of the present invention.

FIG. 1A illustrates a flow manager system that handles packet flows in accordance with an embodiment of the present invention. This system includes flow manger 102 and flow enforcement device 104.

During operation, flow enforcement device 104 receives packets from high-speed pipe 101 and routes the packets through switch 120 to servers 121-123. Flow enforcement device 104 can also perform simple operations on the packets, such as translating packet headers.

Flow manager 102 generates a consistent set of rules for flow enforcement device 104 based on rules received from various components. For example, FIG. 1A illustrates an exemplary set of components, including firewall management component 114, SLA monitoring component 115, transport matching management component 116 and load balancing management component 117. Note that this exemplary set of components is provided for purposes of illustration only. In general, the system can include many other different types of components. Also note that rules from different components can potentially conflict.

Firewall management component 114 provides various security features associated with firewall functions performed by the edge device. For example, firewall management component 114 can implement an access control policy that only allows specific packets to reach servers 121-123.

SLA monitoring component 115 provides various services associated with monitoring service level agreements for customers that make use of servers 110-112.

Transport matching management component 116 matches a network flow with an underlying transport protocol. Note that communications coming into a data center are typically TCP/IP traffic. Furthermore, the source of a communication assumes that the destination is speaking the same protocol. However, a data center may choose to use a different protocol within its own walls for reasons of efficiency or backward compatibility. For example, some companies are presently talking about using Infiniband (IB) within a server cluster. For this to work, some mechanism has to terminate the TCP flow and initiate an IB flow within the cluster. This process is known as "transport matching."

Load balancing management component 117 routes packets to servers 121-123 in a manner that balances load between servers 121-123. For example, if one server is heavily loaded, load balancing management component 117 can route a new flow to a less loaded server.

Flow manager 102 can also receive input from other sources. (1) Flow manager 102 can receive commands from an administrator specifying, for example, how to route specific flows and how to prioritize network services. (2) Flow manager 102 can receive input from an environment interface 108 that communicates with environment agents. (3) Flow manager can also receive input from another interface 106 that communicates with an operating system and applications running on servers 121-123.

Flow manager 102 considers these inputs and rules in creating a single consistent set of flow rules in a low-level form that can be used by flow enforcement device 104. In one embodiment of the present invention, each of the low-level flow rules specifies a filter that defines a set of packets in the packet flow as well as a list of actions to be applied to the set of packets. In this way, the filter can be used to identify packets that the flow rule applies to, and the actions can be applied to the identified packets. In one embodiment of the present invention, flow enforcement device 104 is configured so that rule patterns with longer prefixes match before rule patterns with shorter prefixes.

Structured Data Streams

The rapid growth of structured data entities like eXtensible Markup Language (XML) and its embracement by the Electronic Data Interchange (EDI) has provided a common presentation protocol for a variety of heterogeneous data sources. However, due to the verbose nature of structured data and the likely future adaptation of selective content encryption, general purpose applications and web servers are likely to encounter a performance problem in handling this structured data.

The present invention deals with such structured data streams within in-line network hardware (for example, moving the XLST transformation from web servers to network appliances) such that structured data, matching a specific task, is sent to "specialized" network instances for efficient processing. The present invention efficiently and quickly identifies such "patterns" in the traffic stream for selective data identification and dissemination. Structured data streams (e.g. XML traffic) represent strictly ordered sequences of events and contain embedded objects (a.k.a. elements). During the structured data stream matching process, a stream containing individual objects is matched against a predefined rule set that consists of user defined grammars and actions.

Given a structured data stream (e.g. XML traffic) where elements appear in an ordered sequence with definite constraints, the present invention decides upon an action that matches an input grammar. In order to decide upon the action to be initiated on a particular data stream, the objects in the stream are efficiently and continuously compared against an in-built structured tree built over the input grammar.

Such an approach has its advantages. It empowers network administrators and application developers with the capability to map transaction nature with the preferred modalities of transaction handling. Such examples include but not limited to: structured traffic routing and redirection, selective encryption/decryption of data contents, data transformation, and data filtering.

Hence, the present invention provides a system for fast classification and filtering of structured data as it is streaming in the network. Fast and effective classification of structured data facilitates preferential data dissemination and effectively partitioning the network resources according to the demands of the application. It allows facilitates filtering, redirecting and marking such data streams for controlled and preferential treatment and transmission.

The present invention models the data and the relationship between data as a tree built over a hash function. We call this tree an H-Tree. The technique uses the SHA1 hash function to build a zero-collision (probability of collision is $O(1e^{-48})$) indexed and layered data structure over the element nodes. Similar to B-trees but with a completely different philosophy, the difference in message digest values between element nodes determine the levels of the graph. In conjunction with the layered architecture, we define a Signature Mapping Table (SMT) that makes the data structure memory efficient.

For fast element existence decision, the technique maintains a simplified Bloom filter matrix with controlled degree of false positives. It interfaces with the event generator and drives the set of Evolving Finite Set Machines (EFSM). At each reachable state, a Jaccard coefficient vector is used to pick the most relevant action based on the current event state.

One embodiment of the present invention has two modes of operation: fastmatch and exactmatch. In fastmatch mode, a decision regarding the fate of the data stream is determined by the earliest relevant event while in exact match a decision is made after all the event set related to the data stream is exhausted. One embodiment of the present invention is generic and can be used for scalable filtering of structured data over a predefined data schema.

Flow Manager

Figure 1B:
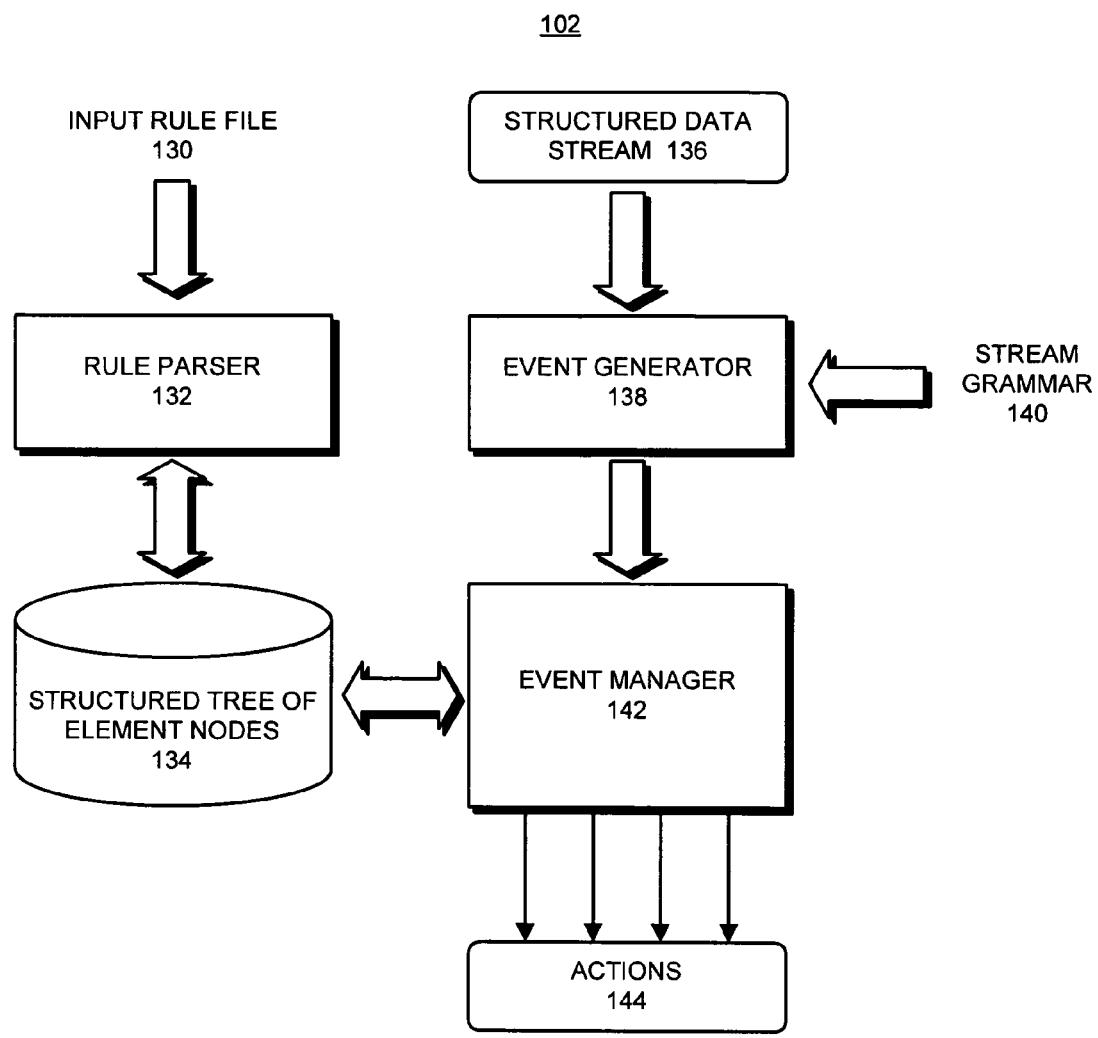
FIG. 1B illustrates the internal structure of a flow manager in accordance with an embodiment of the present invention.

Referring back to FIG. 1A, the present invention makes decisions for packet flows within flow manager 102. The internal structure of flow manager 102 is illustrated in more detail in FIG. 1B. Within flow manager 102, and input rule file 130 is fed through a rule parser 132 to generate a structured tree of element nodes 134. Note that this process can take place off-line.

Next, a structured data stream 136 is fed through event generator 138, which uses a stream grammar to parse packet payloads and to extract elements from structured data stream 136. These elements feed into event manager 142, which determines a set of actions 144 to take based upon the elements.

This process is described in more detail below. We first define a number of terms.

Terminology

Nodes: The nodes in the graph correspond to data defined over the input alphabet. For example, in XML this would be data associated with the opening tag (<). Node ordered precedence is dictated by the input rule file 130 and may be loosely or strictly constrained. The transition events between and in the context of a node, are defined over the transition function (F)

F:(input alphabet)×(union set of all conditions).

In the case of XML traffic, for example, a boolean combination of attributes, elements, element text define the transition function. We use the term "element node" to refer to individual node in the structured data tree.

Rules and Actions: A rule is a tuple, a grammar and an action, where the grammar is defined over the domain (conforming to an established schema) of the application. Thus, Rule:=<Grammar, Action>.

Grammar: A grammar is defined as a combination of valid element nodes over relevant transition functions. Typical actions are, for example, redirecting a traffic stream, dropping a traffic stream and marking a traffic stream for more actions.

Action:=<redirect:ip_address-port>|<filter: DROP>|<filter:PASS>

For XML traffic, for example, the rule is an XPath Expression (XPE), with relative path names, followed by an action.

An example of such a rule is appears in Table 1 below.

TABLE 1

```
begin_xml_rules
/purchase/workorder(value > "1000")
    AND (currency = "USD)/source/"amazon.com";
redirect_ip : 10.12.13 .15-80;
end_xml_rules
```

Input rule file 130 contains a list of such well defined rules that need to be enforced along the path of structured data stream.

Building the Structured Tree

Properly identifying and filtering relevant element nodes from the event generator is vital since doing so drastically minimizes a valid EFSM state search during the next state transition. Keeping this in mind, the choice of a good data structure depends on the type of operation that needs to be performed on the element nodes. For event filtering, we need to determine the existence of an element node and simultaneously retrieve its location in memory. Thus, the starting point of our technique is a Bloom filter matrix with controlled degree of false positives. To keep the retrieval, insertion and search cost low, we introduce a tree built over the SHA1 hash function. We call this an H-tree. The SHA1 hash function (version 1) generates a 160-bit message digest that is used as a signature for the individual node elements. This is message digest is utilized to access the Bloom filter as well as to access the H-tree.

Creation of a Bloom Matrix

Figure 2:
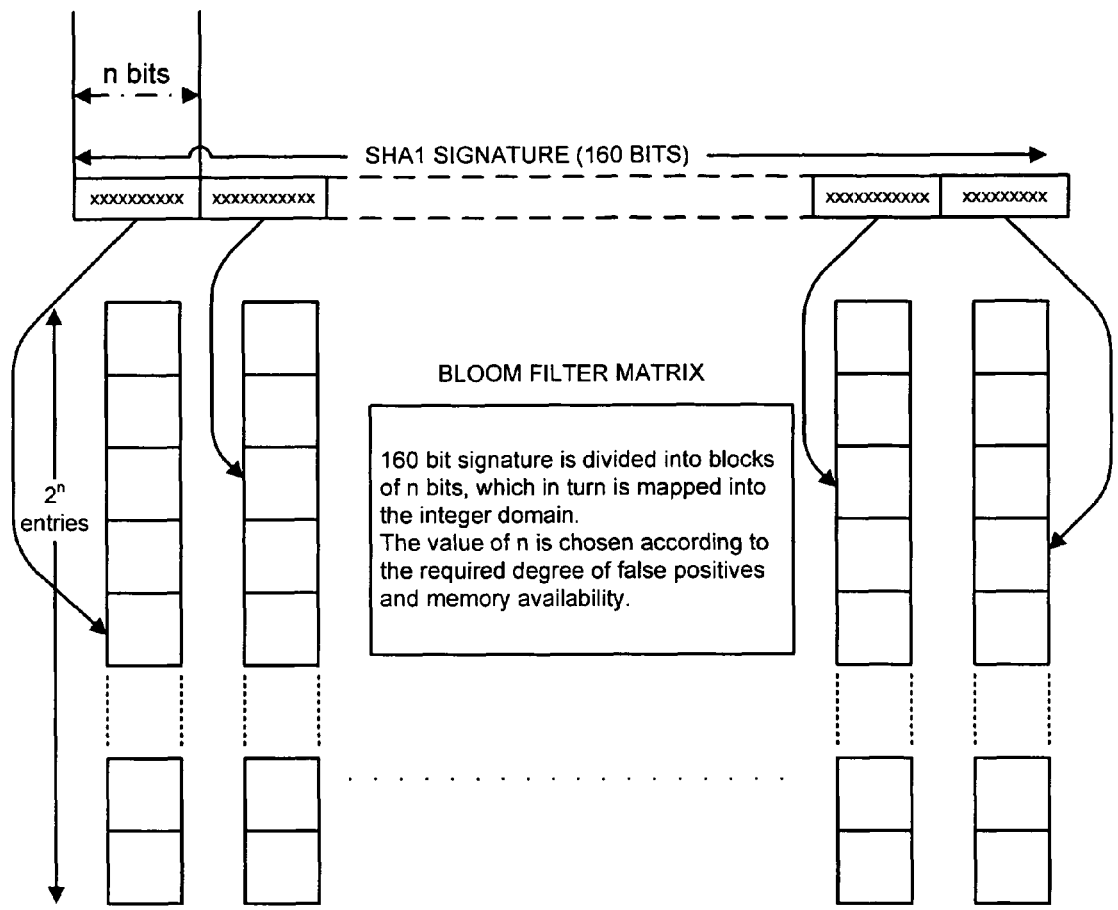
FIG. 2 illustrates a Bloom filter matrix in accordance with an embodiment of the present invention.

A simple Bloom filter matrix is created by grouping a fixed length (say n) bits of the message digest. This weakly corresponds to $\lceil 160/n \rceil$ number of hash functions. Each hash function, in turn, maps the n bits into an integer range of $0..(2^n)-1$. This gives rise to a Bloom matrix of size $(2^n) \times \lceil 160/n \rceil$, which is illustrated in FIG. 2.

The percentage of false positives depends on the number of hash functions (F) and the ratio of the size of the filter (S) to the size of the data set (N). To a good approximation, the false positive rate is given by $\{1-e^{(-F \cdot N/S)}\}^F$. Thus, depending on the available memory, the filter size can be controlled to suit the application needs. To populate the Bloom filter, the index in the Bloom matrix corresponding to the integer value of the corresponding message digest, is set to 1.

Pseudo-code to populate the Bloom matrix appears in Table 2 above. This Bloom matrix is used to confirm the absence of an element node in the structured data tree.

TABLE 2

```
// Begin Procedure
    /* Input: E - Element Node
        Result: set the corresponding entries in the Bloom_matrix */
    for all entries
        set Bloom_matrix [ ] = 0; /* Initialization */
    message_digest = SHA1 (E); /* generate 160-bit message digest */
    for each 0 ≦ i < ⌈160/n⌉
    /* Pick the column in the Bloom matrix */
    Bloom_matrix[(lower_n_bits(message_digest))<<n][i]= 1;
    /* Group n bits, convert to integer value and shift
        the message digest by n for the next iteration */
// End Procedure
```

In cases where an H-tree is built and is not to be subsequently modified, it can be advantageous to perform an analysis first to determine the optimal order in which to apply the Bloom filters (which correspond to different hash value sections) while building the H-tree. In doing so, Bloom filters with fewer collisions (ideally none) should come earlier. This reduces the average search depth for any evenly distributed work load.

The H-Tree

To positively confirm the occurrence of an element node, we have to make sure that it actually exists in the structured graph. The message digest of the SHA1 hash function is used to create a hierarchical tree which we refer to as the H-tree (Hash tree). Since creating a memory chunk of size ($2^n$) units, every time an element node suffers collision, would be memory intensive, we introduce the concept of a Signature Mapping Table (SMT) at each level of the tree. Each entry of the SMT can be visualized as a tuple of the form (k,l) where k is the key and l is the index in the memory block. For very fast retrieval of the index associated with a key, the contents of the SMT is internally arranged as a binary-search-tree.

The basic operations that can be carried out on the tree are: (1) insertion—adding a new element node with signature s; (2) deletion—removing an element node with signature s; and (3) find—retrieving an element node with signature s. None of these operations requires adjusting the H-tree.

Insertion

Figure 3:
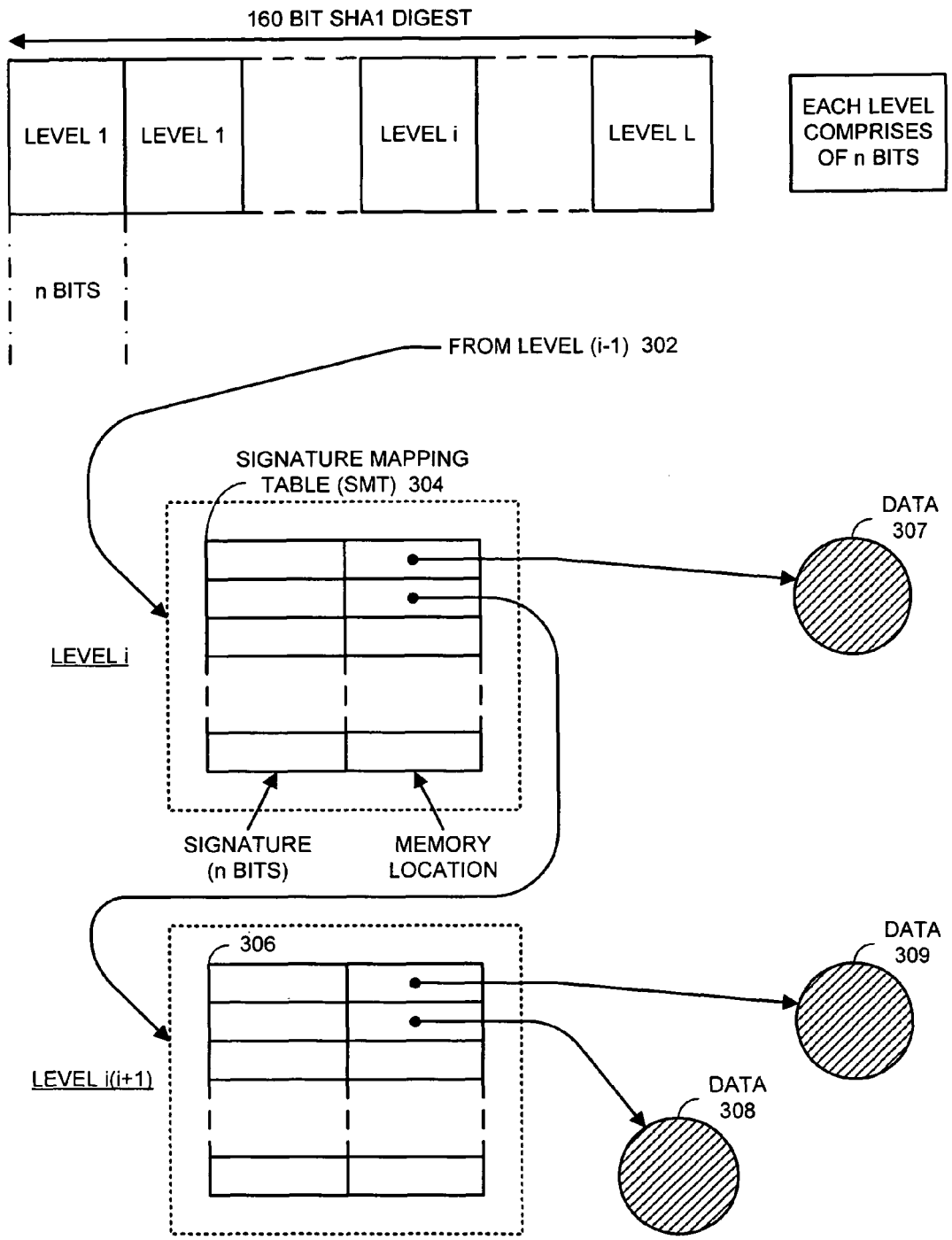
FIG. 3 illustrates an H-tree data structure in accordance with an embodiment of the present invention.

Suppose n bits are used for identifying level i in the tree. Then, the maximum depth of the structured tree is $\lceil 160/n \rceil$. In the ideal case, all elements fit in the first level, implying that the element nodes have at least one bit different among the first n bits. FIG. 3 shows the creation of a structured tree at level i.

TABLE 3

```
/* Input: E - Element Node
    Result: E is inserted in memory */
message_digest = SHA1 (E); /* generate 160 bit message digest */
int i = 0; /* monitors the level of the structured tree */
while (i < ⌈160/n⌉)
    u_int signature = (message_digest< <n);
    /* left shift n bits to generate integer signature for level i
        element_array is the memory block at each level */
    if (check_smt_table (signature) == signature)
        /* Collision at level i */
        curr_elem = element_array[find_smt_table (signature)].entry;
        /* Need to move existing element node */
        element_ array[signature].entry = create_new_element_array;
        insert_in_smt_table (curr_elem); /* Store the element node */
    else
        insert_in_smt_table (curr_elem); /* Store the element node */
    i++;
// End Procedure
```

Insertion is a two step process. First, the proper location for insertion is identified. Then, the insertion of the element node is performed, after updating the SMT. Since the SHA1 generates a 160-bit message digest, we can assume (probability of failure is $O(1e^{-48})$) that the element nodes will differ in at least one bit in at least one block; where a block is defined by grouping n consecutive bits of the message digest implying the presence of $\lceil 160/n \rceil$ blocks.

Figure 4A:
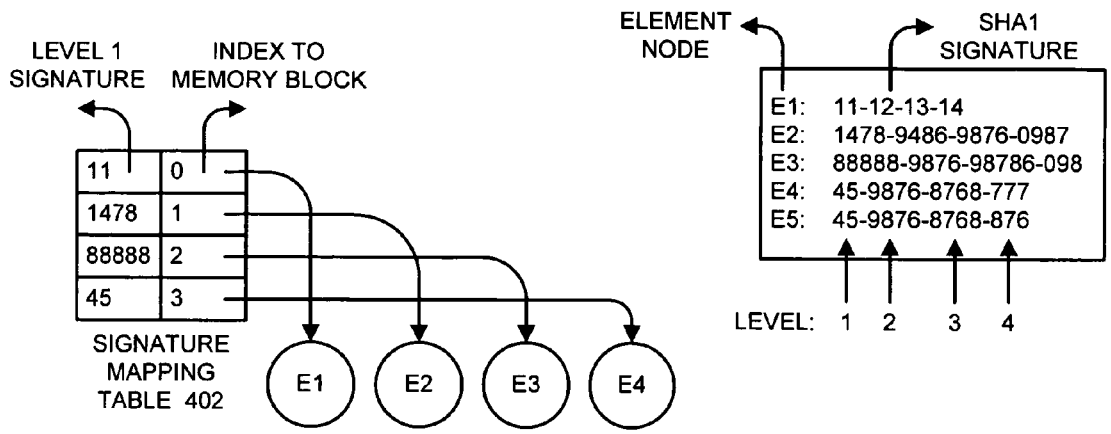
FIG. 4A illustrates an initial state of an H-tree data structure in accordance with an embodiment of the present invention.
Figure 4B:
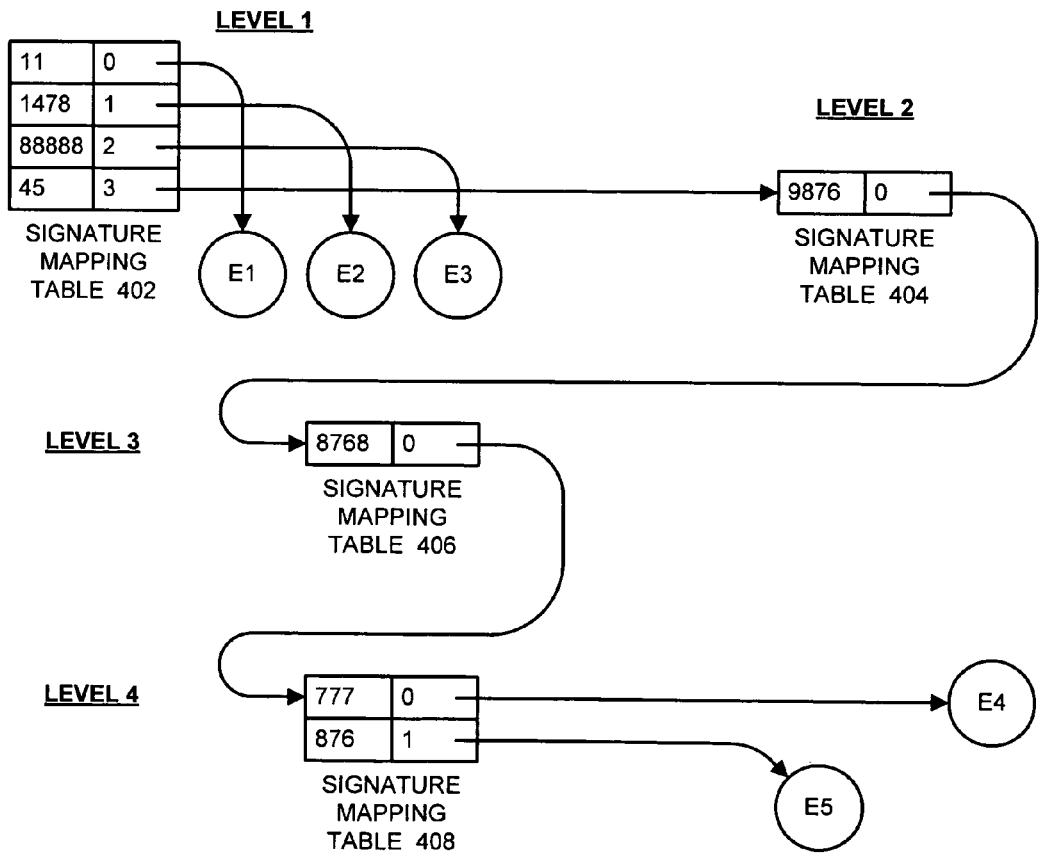
FIG. 4B illustrates the state of the H-tree data structure after insertion of an additional node in accordance with an embodiment of the present invention.

Consider the example shown in FIGS. 4A-4B. The original tree is shown in FIG. 4A. Now, suppose we want to insert an element node, e5, with signature 45-67-1238-9878 (each level is a block of 40 bits, in this case). We observe elements e4 and e5 diverge only at level 4, the maximum possible depth of the tree. FIG. 4B illustrates the creation of a new level, its associated SMT and collision resolution between e5 and e4. Pseudo-code to store the element node appears in Table 3 above.

Deletion

Deletion is a single step process. Since in the SMT an element node has a unique value of key, deletion simply involves deleting the corresponding key entry in the SMT and releasing the memory of the corresponding location in the memory block.

Searching

Searching in an H-tree involves traversing the tree according to the signature block of the element being searched. The search terminates after the element is located (see pseudo-code in Table 4).

The SHA1 message digest is used to reach the element node stored in computer memory. Each block in the structured tree either points to another similar block or contains the element node itself. If each depth of the structured tree corresponds to grouping of n bits of the message digest, then at the worst case we have to traverse a depth of $\lceil 160/n \rceil$.

TABLE 4

```
// Begin Procedure
    /* Input: E - Element Node
        Result: returns the location of the element node in memory */
    message_digest = SHA1 (E); /* generate 160-bit message digest */
    int i = 0; /* monitors the level of the structured tree */
    while (i < ⌈160/n⌉)
        u_ int signature = (message_digest < < n);
        /*left shift to generate integer signature for level i */
        /*element_array is the building block of the tree */
        if (element_ array[signature].entry == element_node)
            /* collision at level i */
            return (element_array[signature].entry);
            /* Return Location */
        i++;
// End Procedure
```

Effectiveness of the H-Tree

The probability of two element nodes having identical same bit pattern (worst-case scenario) is $2/2^{160}$ ($1.35e^{-48}$). Now, suppose we have n element nodes. Each of these element nodes produces a 160-bit message digest. Then, the probability of at least one collision among the n entities is $1-[(1-\frac{1}{2}^{160})]^n$. This is a very small number and since the output of SHA1 is uniformly and randomly distributed due to its strong avalanche property, we can say with a certain degree of confidence that this scheme will be able to handle very large amount of data nodes.

The depth of the tree is determined by the message digest difference. In the best case, we have a tree of depth 1 where the element nodes differ in at least one bit in the first n bits. In the worst case, the depth is $\lceil 160/n \rceil$.

Checking for the Existence of an Element Node

Checking the Bloom Filter

To check whether an element node is part of the Bloom matrix, we compute the SHA1 hash function of the element and check the corresponding entries of the Bloom matrix (see pseudo-code in Table 5). If any of the entries is not set (i.e. equal to 0), then the element node is definitely not a part of the Bloom matrix. Otherwise, it probably is and we need to search through the H-tree.

TABLE 5

```
// Begin Procedure
/* Input: E - Element Node
Result: true: all entries are equal to 1
false: at least one entry is not equal to 1 */
message_digest = SHA1 (E); /* generate 160 bit message digest */
for each 0 <= i < [ceiling(160/n)]
    /* Pick the column in the Bloom matrix */
    if (set Bloom_matrix[(lower_n_bits(message_digest))<<n][i]!=1)
    /* Group n bits, convert to integer value and shift
    the message digest by n for the next iteration */
    return false;
return true; /* outside the loop */
// End Procedure
```

Checking the H-Tree

This procedure is exactly similar to the one described above

Evolving Finite State Machines (EFSM)

Each state in the ESFM indicates a context and only events related to present state element nodes are accepted by the EFSM. The EFSM has initial state set according to the input "rule file".

The following events are generated by the event parser: startStream( ) startElementNode( ) elementConstraints( ) endElementNode( ) and endStream( ) "startStream( )" and "endStream( )" denote the start and end of the structured data stream. "startElementNode( )" triggers the context of the element node while "endElementNode( )" closes the context. "elementConstraints( )" defines all the events and transition functions within the namespace of the element node.

State Transitions

State Transitions in the EFSM occur according to transition functions defined in the context of the present element node. On receiving a startElementNode( ) event, the EFSM waits for events corresponding to elementConstraints( ). The following cases can happen:

No events for the element node: In this case, the system checks if there are actions corresponding to zero event list in the element node. If the action list is not empty and the technique is running in fastmatch mode, it immediately returns the action in a round-robin fashion (for more than one match). For exactmatch, the EFSM mutates to the child as dictated by the traversal of the structured tree.

Events for element node: In this case, the system creates a vector list of all the events and compares with the event list stored in the namespace of the element node. The outcome of the technique described below determines the evolution of the EFSM.

Checking Run-Time Constraints within the Namespace of an Element Node

TABLE 6

/workorder (value > "1000") OR (priority > "2") OR (currency = "USD";
   -- set1 with member cardinality 3 ---

TABLE 6-continued

/workorder (value < = "2765") OR (customer = "sun.com");
   -- set2 with member cardinality 2 ---
/workorder (department ! = "sales") OR (value > 345);
   -- set3 with member cardinality 2 ---
/workorder (department = "support") AND (priority = "1");
   -- set4 with member cardinality 1 (note this) ---

As stated above, all events in the context of an element node are stored as members of a set (or vector list). There might be boolean relationship between the members themselves. For example, consider the following context in the case of element node "workorder" for XML traffic. Suppose we have the following grammar in the input "rule file" (see Table 6).

And now, suppose in the XML data stream, in the context of XML element "workorder", we have /workorder value="1313", priority="6"</workorder>.

Figure 5:
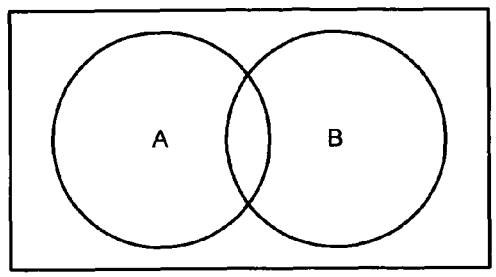
FIG. 5 illustrates the use of Jaccard coefficients to select an action for a packet flow in accordance with an embodiment of the present invention.
Figure 5:
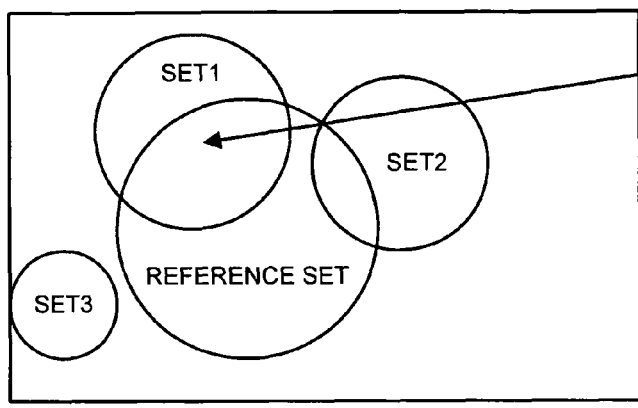

Accordingly, all the above sets have one or more members which match this criterion but our aim is to find the maximum similarity measure quickly. So, we calculate the Jaccard coefficients. Referring to FIG. 5, the Jaccard coefficient between two sets A and B is defined as $J=(A*B)/(A+B)$ (where "*" represents the intersection operator and "+" represents the union operator) for each of the sets with respect to our target set (value="1313", priority="6"). For set1, $J=2/3$; for set2, $J=1/2$; for set3, $J=1/2$; and for set4, $J=0/1$. So, set1 with the highest value of J ($=2/3$) is chosen. It might so happen that all the J values are same. In this case, the first occurring set among the sets with highest J vales is chosen.

Summary

Figure 6:
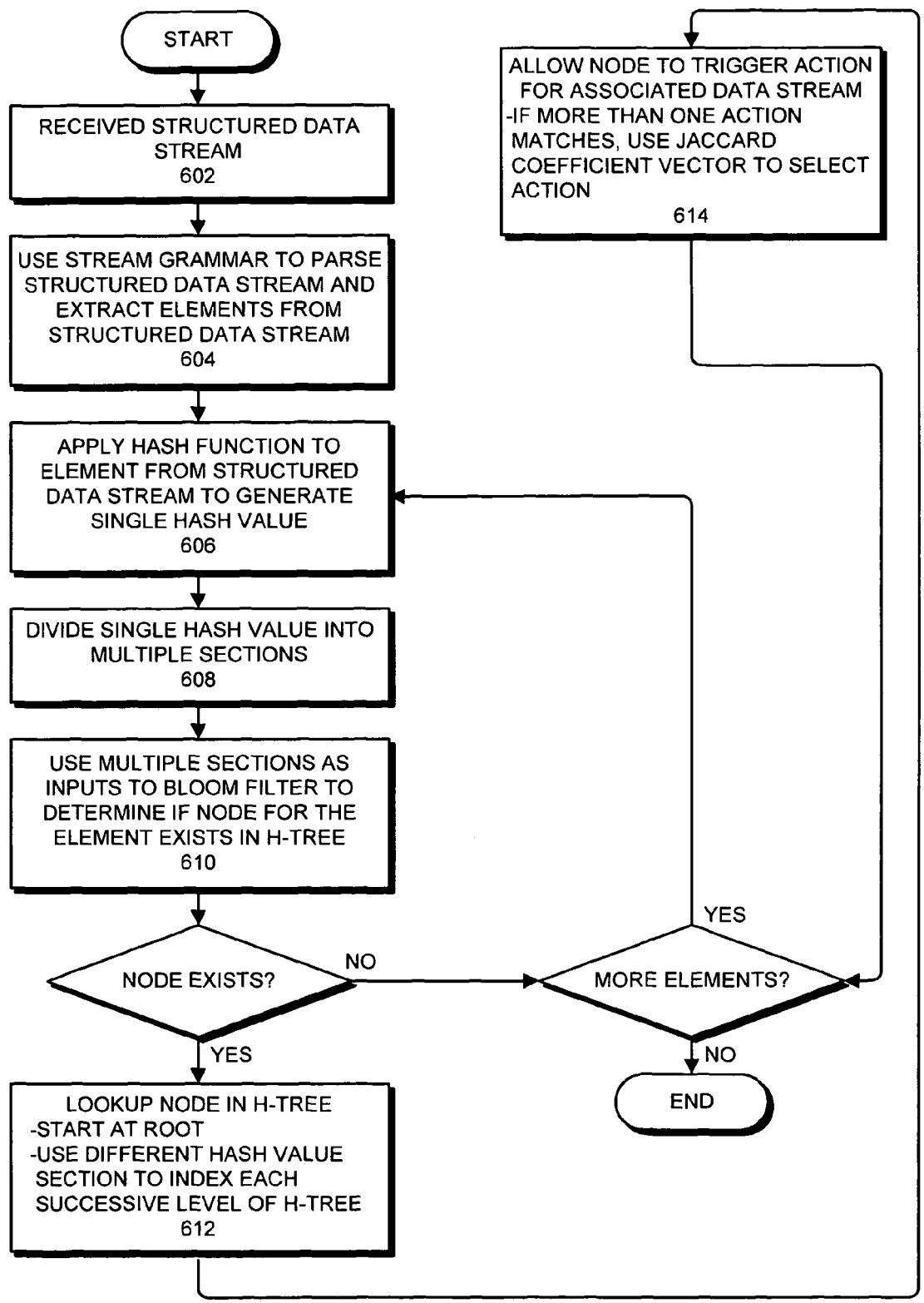
FIG. 6 presents a flow chart illustrating the process of looking up a node for an element in a structured data stream in accordance with an embodiment of the present invention.

In summary, FIG. 6 presents a flow chart illustrating the process of looking up a node for an element in a structured data stream in accordance with an embodiment of the present invention. The system first receives a structured data steam, possibly at an edge device in a data center (step 602). Then, the system uses a stream grammar, such as an XML grammar, to part the structured data stream and to extract elements from the structured data stream (step 604).

Next, for each element, the system applies a hash function to the element to produce a single hash value, such as a SHA1 message digest (step 606). The system then divides this single hash value into multiple sections (step 608). For example, a 160-bit SHA1 message digest can be divided into $\lceil 160/n \rceil$ n bit sections.

Next, the system uses the multiple sections as inputs to a Bloom filter to determine if a node for the element exists in a corresponding H-tree (step 610).

If the node exists, the system looks up an element for the node it the H-tree. This involves starting at the root of the H-tree and using a different section of the hash value to index each successive level of the H-tree (step 612). As mentioned above, for a given internal node of the H-tree, the hash value section is used as an index into a signature mapping table (SMT) containing entries that point to child nodes of the internal node. These child nodes can either be element nodes or lower-level internal nodes of the H-tree.

Next, the system uses transition functions defined the in context of the element node to trigger state transitions, which determine actions for the associated data stream (step 614). If more than one action matches, the system uses a Jaccard coefficient vector to select the appropriate action.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for classifying elements in a structured data stream, comprising:
in a computer system,
receiving an element from the structured data stream;
applying a hash function to the element to generate a single hash value for the element;
dividing the single hash value into multiple sections, wherein each section comprises a fixed length of bits;
using the multiple sections as inputs to a Bloom filter to determine if a node for the element exists in a lookup structure; and
upon determining that the node exists in the lookup structure looking up the node for the element in the lookup structure;
whereby initially using the Bloom filter prevents unnecessary lookups in the lookup structure; and
whereby using multiple sections of a single hash value as inputs to the Bloom filter eliminates the need to compute multiple hash values.

2. The method of claim 1, wherein receiving the element from the structured data stream involves:
receiving the structured data stream, which contains elements in an ordered sequence; and
using a stream grammar to parse the structured data stream, and to extract the element from the structured data stream.

3. The method of claim 1, wherein looking up the node for the element in the lookup structure involves looking up the node for the element in a hash tree (H-tree).

4. The method of claim 3,
wherein looking up the node for the element in the H-tree involves starting at the root of the H-tree and using a different hash value section to index each successive level of the H-tree;
wherein each internal node in the H-tree includes a signature mapping table (SMT) which maps a hash value section, which is associated with the level of the H-tree to child nodes of the internal node; and
wherein a child node can be either an internal node or an element node.

5. The method of claim 1,
wherein using the multiple hash key sections as inputs to the Bloom filter involves using each hash key section, which is of length n bits, to perform a lookup into a different column of a Bloom matrix;
wherein the Bloom matrix has a different column for each hash key section;
wherein each column in the Bloom matrix is of length $2^n$; and
wherein if any entry retrieved during a column lookup is not set, the method determines that the corresponding element does not exist in the lookup structure.

6. The method of claim 1,
wherein the node for the element can trigger an action for an associated data stream; and
wherein the action can involve filtering, redirecting or marking the associated data stream.

7. The method of claim 6, wherein if more than one action can be triggered for the associated data stream, a Jaccard coefficient vector is used to select an action.

8. The method of claim 1, wherein prior to receiving the element, the method further comprises generating the H-tree by:
performing an analysis to determine an optimal order in which to apply Bloom filters corresponding to different hash value sections, wherein Bloom filters with fewer collisions occur earlier in the optimal ordering; and
building the H-tree based on the optimal ordering, thereby reducing the average search depth for an evenly distributed work load.

9. The method of claim 1, further comprising inserting an element into the H-tree by:
identifying a location in the H-tree to insert the element into; and
inserting the element into the identified location.

10. The method of claim 1, further comprising deleting a node for an element from the H-tree by:
deleting an entry which points to the node from a signature mapping table, wherein the signature mapping table is located in an internal node of the H-tree; and
releasing a memory block occupied by the node.

11. The method of claim 1, wherein the structured data stream is structured in accordance with the eXtensible Markup Language (XML) standard.

12. A computer-readable storage medium storing instructions that when executed by a computer cause the computer to perform a method for classifying elements in a structured data stream, the method comprising:
receiving an element from the structured data stream;
applying a hash function to the element to generate a single hash value for the element;
dividing the single hash value into multiple sections, wherein each section comprises a fixed length of bits;
using the multiple sections as inputs to a Bloom filter to determine if a node for the element exists in a lookup structure; and
upon determining that the node exists in the lookup structure, looking up the node for the element in the lookup structure;
whereby initially using the Bloom filter prevents unnecessary lookups in the lookup structure; and
whereby using multiple sections of a single hash value as inputs to the Bloom filter eliminates the need to compute multiple hash values.

13. The computer-readable storage medium of claim 12, wherein receiving the element from the structured data stream involves:
receiving the structured data stream, which contains elements in an ordered sequence; and
using a stream grammar to parse the structured data stream, and to extract the element from the structured data stream.

14. The computer-readable storage medium of claim 12, wherein looking up the node for the element in the lookup structure involves looking up the node for the element in a H-tree.

15. The computer-readable storage medium of claim 14,
wherein looking up the node for the element in the H-tree involves starting at the root of the H-tree and using a different hash value section to index each successive level of the H-tree;
wherein each internal node in the H-tree includes a signature mapping table (SMT) which maps a hash value section, which is associated with the level of the H-tree, to child nodes of the internal node; and
wherein a child node can be either an internal node or an element node.

16. The computer-readable storage medium of claim 12,
wherein using the multiple hash key sections as inputs to the Bloom filter involves using each hash key section, which is of length n bits, to perform a lookup into a different column of a Bloom matrix;
wherein the Bloom matrix has a different column for each hash key section;
wherein each column in the Bloom matrix is of length $2^n$; and
wherein if any entry retrieved during a column lookup is not set, the method determines that the corresponding element does not exist in the lookup structure.

17. The computer-readable storage medium of claim 12,
wherein the node for the element can trigger an action for an associated data stream; and
wherein the action can involve filtering, redirecting or marking the associated data stream.

18. The computer-readable storage medium of claim 17, wherein if more than one action can be triggered for the associated data stream, a Jaccard coefficient vector is used to select an action.

19. The computer-readable storage medium of claim 12, wherein the method further comprises inserting an element into the H-tree by:
identifying a location in the H-tree to insert the element into; and
inserting the element into the identified location.

20. The computer-readable storage medium of claim 12, wherein prior to receiving the element, the method further comprises generating the H-tree by:
performing an analysis to determine an optimal order in which to apply Bloom filters corresponding to different hash value sections, wherein Bloom filters with fewer collisions occur earlier in the optimal ordering; and
building the H-tree based on the optimal ordering, thereby reducing the average search depth for an evenly distributed work load.

21. The computer-readable storage medium of claim 12, wherein the method further comprises deleting a node for an element from the H-tree by:
deleting an entry which points to the node from a signature mapping table, wherein the signature mapping table is located in an internal node of the H-tree; and
releasing a memory block occupied by the node.

22. The computer-readable storage medium of claim 12, wherein the structured data stream is structured in accordance with the eXtensible Markup Language (XML) standard.

23. An apparatus that classifies elements in a structured data stream, comprising:
a flow enforcement device configured to receive an element from the structured data stream;
a flow manager coupled to the flow input device configured to:
apply a hash function to the element to generate a single hash value for the element;
divide the single hash value into multiple sections, wherein each section comprises a fixed length of bits; and
use the multiple sections as inputs to a Bloom filter to determine if the element exists in a lookup structure;
wherein upon determining that a node for the element exists in the lookup structure, the flow manager is configured to look up the node for the element in the lookup structure.

* * * * *